US007047022B2

(12) United States Patent
Aoyama

(10) Patent No.: US 7,047,022 B2
(45) Date of Patent: May 16, 2006

(54) POSITIONING METHOD USING MOBILE TERMINAL AND MOBILE TERMINAL HAVING POSITIONING FUNCTION

(75) Inventor: Akio Aoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 600 days.

(21) Appl. No.: 09/985,299

(22) Filed: Nov. 2, 2001

(65) Prior Publication Data
US 2002/0055362 A1 May 9, 2002

(30) Foreign Application Priority Data
Nov. 7, 2000 (JP) .............................. 2000-339217

(51) Int. Cl.
H04Q 7/20 (2006.01)
(52) U.S. Cl. ................................ 455/456.6; 455/404.2
(58) Field of Classification Search ............ 455/456.1, 455/456.2, 456.6, 404.2; 342/450, 458, 464, 342/465
See application file for complete search history.

(56) References Cited

U.S. PATENT DOCUMENTS

| 5,926,765 A | 7/1999 | Sasaki .......................... 455/456 |
| 5,943,014 A * | 8/1999 | Gilhousen ................... 342/465 |
| 6,009,088 A | 12/1999 | Taguchi et al. |
| 6,181,944 B1 | 1/2001 | Uebayashi et al. .......... 455/456 |
| 6,275,186 B1 * | 8/2001 | Kong .......................... 342/363 |
| 6,347,228 B1 * | 2/2002 | Ludden et al. ........... 455/456.5 |
| 6,421,009 B1 * | 7/2002 | Suprunov .................. 342/465 |
| 6,519,464 B1 * | 2/2003 | Santhoff et al. ......... 455/456.5 |
| 2002/0118723 A1 * | 8/2002 | McCrady et al. ........... 375/130 |

FOREIGN PATENT DOCUMENTS

| GB | 2 298 099 A | 8/1996 |
| JP | 9-200112 | 7/1997 |
| JP | 09-215042 | 8/1997 |
| JP | 10-048322 | 2/1998 |
| JP | 10-213644 | 8/1998 |
| JP | 10-322752 | 12/1998 |
| JP | 11-075244 | 3/1999 |
| JP | 11-220766 | 8/1999 |
| JP | 11-243575 | 9/1999 |
| JP | 2000-102060 | 4/2000 |
| JP | 2001-359143 | 12/2001 |
| WO | WO 01/57547 A1 | 8/2001 |
| WO | WO 01/58098 A2 | 8/2001 |

* cited by examiner

Primary Examiner—Nguyen T. Vo
(74) Attorney, Agent, or Firm—Foley & Lardner LLP

(57) ABSTRACT

A mobile terminal has a neighboring mobile terminal communication unit for communicating with a neighboring mobile terminal existing near the mobile terminal for acquiring position information on the neighboring mobile terminal, and a position information calculation unit for calculating position information of the mobile terminal based on the position information acquired from the neighboring mobile terminal when such position information is available.

22 Claims, 5 Drawing Sheets

POSITIONING METHOD USING MOBILE TERMINAL AND MOBILE TERMINAL HAVING POSITIONING FUNCTION

BACKGROUND OF THE INVENTION

1. Field of the Invention

The present invention relates to a positioning method using a mobile terminal and a mobile terminal having a positioning function, and more particularly, to a positioning method using a mobile terminal which performs positioning by communicating information among a plurality of mobile terminals, and a mobile terminal having a positioning function.

2. Description of the Related Art

In recent years, mobile terminals such as a personal digital assistant (PDA), a portable telephone and the like have implemented a function of positioning for these mobile terminals.

Conventionally, as illustrated in FIG. 1, when a mobile terminal 1 performs positioning, a positioning apparatus 2 in an existing positioning system typically undertakes the positioning, and supplies resulting position information to the mobile terminal 1.

For example, a typical one of existing positioning systems is a global positioning system (GPS). The GPS comprises a plurality of artificial satellites orbiting the earth, each of which emits a positioning signal which has temporal information multiplexed with satellite position information. On the earth, the positioning signals from the plurality of GPS satellites are received to calculate times required for radio waves to reach from the respective satellites, and calculate the distances from the respective satellites for the positioning. The GPS features in its service area globally covering the entire earth and extremely high positioning accuracy.

Another existing positioning system employs a method of positioning a mobile terminal, when it is a portable telephone, using information such as the position of a base station connected to the portable telephone, a received field strength, and the like.

In addition, a simple positioning method involves receiving signal from a position information beacon apparatus, which has been previously installed at a fixed location, to acquire position information from the received signal.

The conventional positioning systems and methods for mobile terminals as described above, however, have problems as follows:

(1) The positioning method which acquires position information using the GPS requires sufficiently open sky at a site at which the positioning is performed, due to the nature of the GPS that receives signals emitted from satellites to acquire the position information based on received signals. If any object exists and blocks signals from the satellites, falling down from the sky, the positioning system is prevented from correctly receiving the signals emitted from a number of satellites required for the positioning. A failure in correctly receiving the signals emitted from the number of satellites required for the positioning would result in a deteriorated positioning accuracy. Particularly, if the number of satellites from which signals are received is three or less, the positioning itself becomes difficult to achieve.

However, the open sky is not always available at a site at which the positioning is required. Specifically, the positioning is often required within buildings, and in urban areas surrounded by buildings. For the reason set forth above, only a GPS positioning apparatus equipped in a mobile terminal would encounter difficulties in achieving the positioning within a building, and in an urban area surrounded by buildings.

(2) The positioning method using information such as the position of a base station connected to a portable telephone, which serves as a mobile terminal, a received field strength, and the like, suffers from a low positioning accuracy, and also encounters difficulties in achieving highly accurate positioning within a building or the like, as is the case with the positioning method utilizing the GPS.

(3) The positioning method which acquires position information by receiving a signal from a position information beacon apparatus previously installed at a fixed location is incapable of achieving the positioning at a site at which no beacon apparatus is installed.

SUMMARY OF THE INVENTION

It is an object of the present invention to provide a positioning method using a mobile terminal and a mobile terminal having a positioning function which are capable of realizing highly accurate positioning even within a building and in an urban area surrounded by buildings, i.e., at a site at which no signal can be received from an existing positioning system.

According to the present invention, when neighboring mobile terminal communicating means which included the mobile terminal can acquire position information on a neighboring mobile terminal existing near the mobile terminal from the neighboring mobile terminal, position information calculating means calculates position information on the mobile terminal based on the position information acquired from the neighboring mobile terminal.

In this way, since the position information on the mobile terminal is calculated using the position information on the neighboring mobile terminal existing near the mobile terminal, the position of the mobile terminal can be calculated to perform the positioning by means of the mobile terminal, even when the mobile terminal exists at a site at which the mobile terminal, even equipped with a positioning apparatus of an existing positioning system, suffers from an insufficient positioning accuracy or fails to achieve the positioning, or the like, or even when the mobile terminal is not equipped with a positioning apparatus of an existing positioning system.

Also, when neighboring mobile terminal distance measuring means calculates the distance between the mobile terminal and a neighboring mobile terminal existing near the mobile terminal, more accurate position information can be provided even when neighboring mobile terminals unevenly distribute.

Further, when recursive cooperative positioning means controls the mobile terminal to recursively repeat the acquisition of position information from neighboring mobile terminals existing near the mobile terminal, the mobile terminal can acquire position information on a larger number of neighboring mobile terminals to further improve the positioning accuracy.

In addition, when cooperative positioning duplication/divergence preventing means controls the mobile terminal to limit the number of times recursive position information is acquired and to prevent the mobile terminal from acquiring position information repeatedly from one mobile terminal, it is possible to prevent the divergence of a range in which the cooperative positioning is performed among mobile terminals, and the acquisition of duplicated position information from a mobile terminal from which the position information has already been acquired.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

First Embodiment

Figure 2:
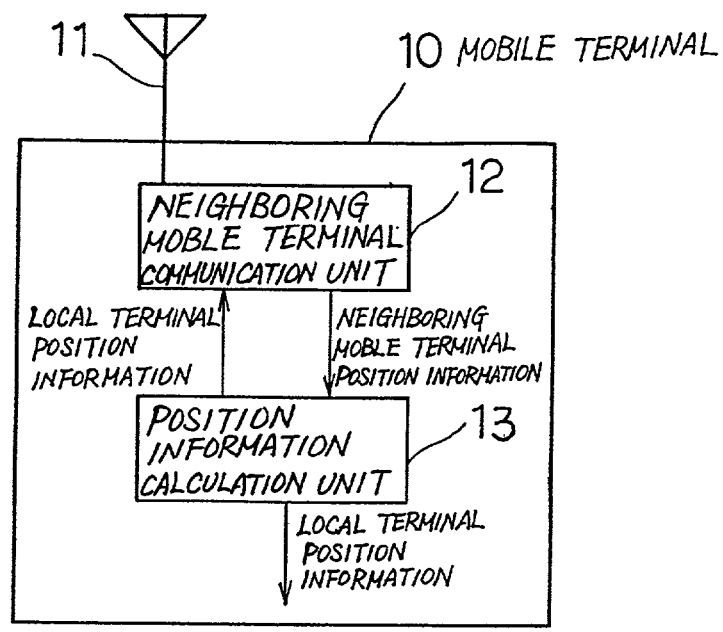
FIG. 2 is a block diagram illustrating a first embodiment of a mobile terminal having a positioning function according to the present invention.

As illustrated in FIG. 2, a mobile terminal according to a first embodiment comprises antenna 11 for transmitting and receiving a radio signal; neighboring mobile terminal communication unit 12 for transmitting and receiving information with neighboring mobile terminals through antenna 11; and position information calculation unit 13 for calculating information on the position of mobile terminal 10.

Antenna 11 is a radio communication element for physically emitting a signal generated in neighboring mobile terminal communication unit 12 into the space and for receiving signals transmitted from neighboring mobile terminals from the space.

Neighboring mobile terminal communication unit 12 supplies antenna 11 with a signal to be transmitted to neighboring mobile terminals existing around mobile terminal 10 and receives signals transmitted from the neighboring mobile terminals through antenna 11 for making mutual communications with the neighboring mobile terminals. As the signal transmitted to the neighboring mobile terminals, local terminal position information calculated in position information calculation unit 13 is supplied to antenna 11. On the other hand, as the signals received from the neighboring mobile terminals, information on the positions of the neighboring mobile terminals usable for positioning is received from the neighboring mobile terminals and supplied to position information calculation unit 13. Here, the information usable for positioning refers to position information itself comprised of the longitude and latitude of a mobile terminal, or numerical information representative of a position in an existing positioning system. Alternatively, such information usable for positioning may be some GPS signal which can only achieve insufficient positioning, or a probability density function which represents a position including uncertainty.

Position information calculation unit 13 uses position information on a plurality of neighboring mobile terminals supplied from neighboring mobile terminal communication unit 12 to make calculations required for the positioning, estimates the position of mobile terminal 10 and supplies the estimated position to neighboring mobile terminal communication unit 12 as local terminal position information.

In the following, explanation will be given of a positioning method using the mobile terminal configured as described above.

Figure 3:
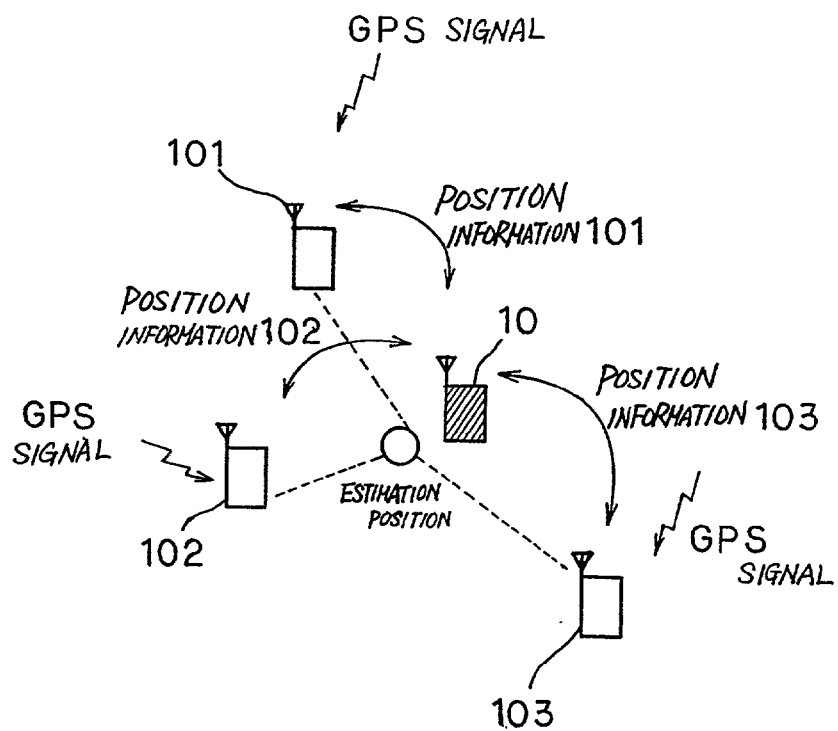
FIG. 3 is a diagram for explaining an exemplary positioning method using the mobile terminal illustrated in FIG. 2.

As illustrated in FIG. 3, when mobile terminal 10 exists at a site at which mobile terminal 10, even equipped with a positioning apparatus of an existing positioning system, suffers from an insufficient positioning accuracy or fails to achieve the positioning, or when mobile terminal 10 is not equipped with such a positioning apparatus of the existing positioning system, neighboring mobile terminal communication unit 12 communicates terminal position information usable for the positioning between mobile terminal 10 and neighboring mobile terminals 101–103.

For example, as illustrated in FIG. 3, assume that mobile terminal 10 exists within a building or the like so that it can receive no GPS signals or beacon signals, whereas three neighboring mobile terminals 101–103 exist out of the building and have already received GPS signals or beacon signals and acquired position information.

When neighboring mobile terminal communication unit 12 in mobile terminal 10 can acquire neighboring mobile terminal position information on neighboring mobile terminals 101–103 from neighboring mobile terminals 101–103 which have already acquired the position information, the neighboring mobile terminal position information on neighboring mobile terminals 101–103 is supplied to position information calculation unit 13 which calculates position information on mobile terminal 10 based on the neighboring mobile terminal position information supplied from neighboring mobile terminal communication unit 12. In calculating the position information on mobile terminal 10 in position information calculation unit 13, since mobile terminal 10 exists near three neighboring mobile terminals 101–103 with a high probability, an average of the neighboring mobile terminal position information on three neighboring mobile terminals 101–103 is calculated as the position information on mobile terminal 10. This method provides a higher accuracy as a larger number of mobile terminals exist near mobile terminal 10 and the neighboring mobile terminals more uniformly distribute. Since mobile terminals such as PDA, portable telephone and the like are highly likely to densely distribute in an urban area, this method can improve the positioning accuracy when neighboring mobile terminals have position information.

The position information on mobile terminal 10 calculated therein is also supplied to mobile terminals existing nearby such that the position information can be utilized by other mobile terminals for positioning.

In this way, even in a situation where a mobile terminal could not otherwise perform the positioning, the mobile terminal can achieve the positioning by communicating position information with neighboring mobile terminals.

In the foregoing manner, this embodiment does not rely directly on an existing positioning system but mutually communicates information usable in the positioning with mobile terminals existing nearby to dynamically form a temporary local positioning system for achieving the positioning. It should be particularly pointed out that the information usable for the positioning in the mobile terminal is not communicated with conventional beacon apparatuses or repeaters but with neighboring mobile terminals.

As appreciated, neighboring mobile terminal communication unit 12 is not limited to a method based on direct communications between the terminal in which neighboring mobile terminal communication unit 12 is incorporated and neighboring mobile terminals, as represented by BLUETOOTH and PHS hand set communications.

Figure 4:
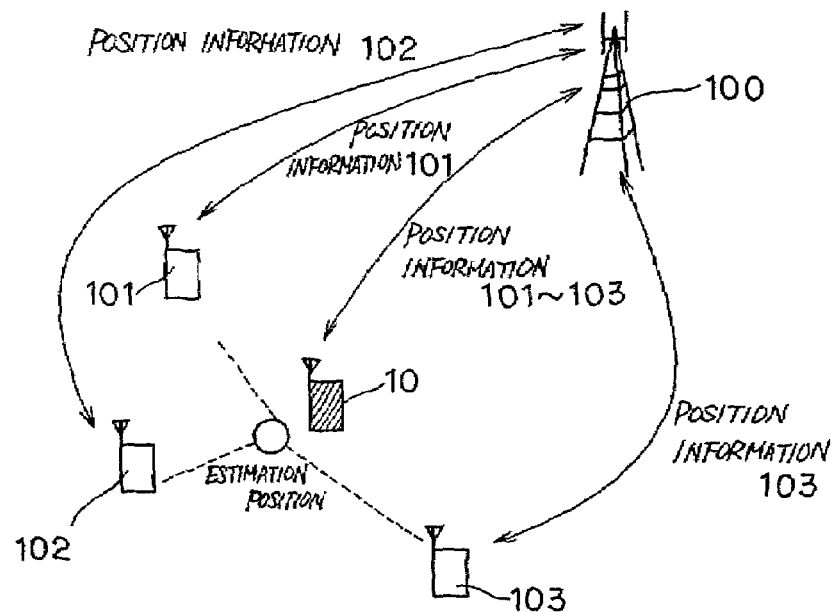
FIG. 4 is a diagram for explaining another exemplary positioning method using the mobile terminal illustrated in FIG. 2.

Also, as illustrated in FIG. 4, it is contemplated to employ a method of acquiring position information on neighboring mobile terminals 101–103 through base station 100 of a mobile communication system for portable telephones, PHS or the like.

Second Embodiment

Figure 5:
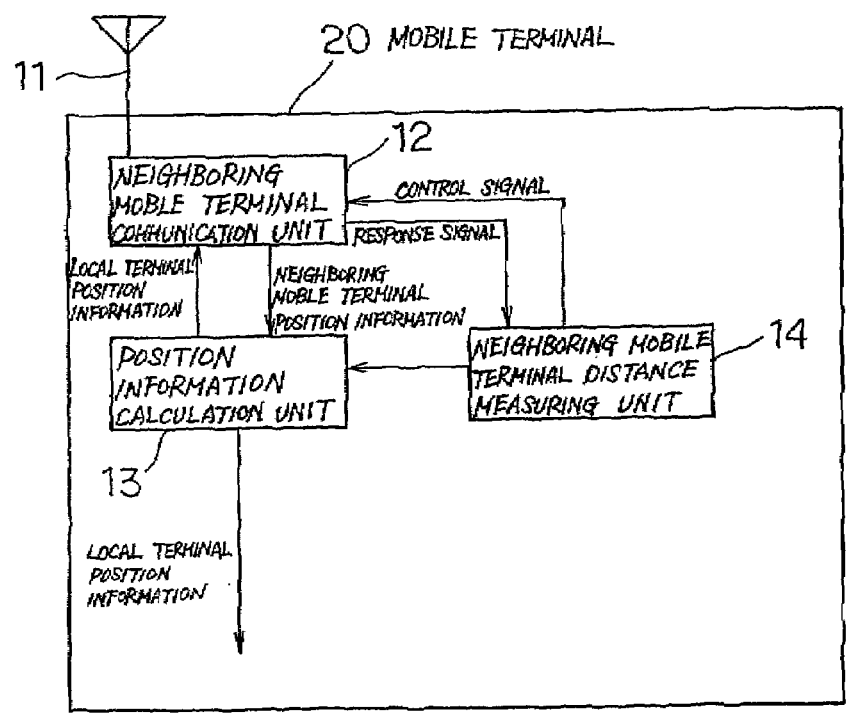
FIG. 5 is a block diagram illustrating a second embodiment of the mobile terminal having a positioning function according to the present invention.

As illustrated in FIG. 5, mobile terminal 20 according to a second embodiment is additionally provided with neighboring mobile terminal distance measuring unit 14 for measuring the distance between mobile terminal 20 and a neighboring mobile terminal, in addition to the components of mobile terminal 10 illustrated in FIG. 2.

Neighboring mobile terminal distance measuring unit 14, for example, gradually increases the field strength of a signal transmitted from mobile terminal 20 to neighboring mobile terminals to estimate the distance between mobile terminal 20 and a neighboring mobile terminal based on the field strength at which a response is returned from the neighboring mobile terminal.

In this event, for measuring the distance, neighboring mobile terminal distance measuring unit 14 supplies neighboring mobile terminal communication unit 12 with a control signal for controlling the field strength of a signal transmitted from neighboring mobile terminal communication unit 12 through antenna 11.

Neighboring mobile terminal communication unit 12 gradually increases the field strength of the signal transmitted to neighboring mobile terminals, based on the control signal supplied from neighboring mobile terminal distance measuring unit 14, and transmits the signal at the gradually increased field strength.

Subsequently, upon receipt of a response signal from a neighboring mobile terminal for the signal transmitted from mobile terminal 20, neighboring mobile terminal communication unit 12 supplies the response signal to neighboring mobile terminal distance measuring unit 14.

As the response signal is supplied from neighboring mobile terminal communication unit 12, neighboring mobile terminal distance measuring unit 14 estimates the distance to the neighboring mobile terminal based on the field strength of the transmitted signal in neighboring mobile terminal communication unit 12 at the time the response signal is supplied thereto, and supplies position information calculation unit 13 with the result of estimation as inter-terminal distance information.

When a neighboring mobile terminal is transmitting a signal at a previously set constant strength, a reception sensitivity is gradually increased in neighboring mobile terminal communication unit 12 to estimate the distance between mobile terminal 20 and the neighboring mobile terminal based on the reception sensitivity at the time mobile terminal 20 receives the signal transmitted from the neighboring mobile terminal.

In this event, for measuring the distance, neighboring mobile terminal distance measuring unit 14 supplies neighboring mobile terminal communication unit 12 with a control signal for controlling the reception sensitivity in neighboring mobile terminal communication unit 12.

Neighboring mobile terminal communication unit 12 gradually increases the reception sensitivity based on the control signal supplied from neighboring mobile terminal distance measuring unit 14, and receives respective signals at the gradually increased reception sensitivity.

Subsequently, upon receipt of a response signal from a neighboring mobile terminal for the signal transmitted from mobile terminal 20, neighboring mobile terminal communication unit 12 supplies the response signal to neighboring mobile terminal distance measuring unit 14.

As the response signal is supplied from neighboring mobile terminal communication unit 12, neighboring mobile terminal distance measuring unit 14 estimates the distance to the neighboring mobile terminal based on the reception sensitivity in neighboring mobile terminal communication unit 12 at the time the response signal is supplied, and supplies position information calculation unit 13 with the result of estimation, as inter-terminal distance information.

It is also possible to estimate the distance between mobile terminal 20 and a neighboring mobile terminal by measuring a propagation delay between mobile terminal 20 and the neighboring mobile terminal.

Figure 6:
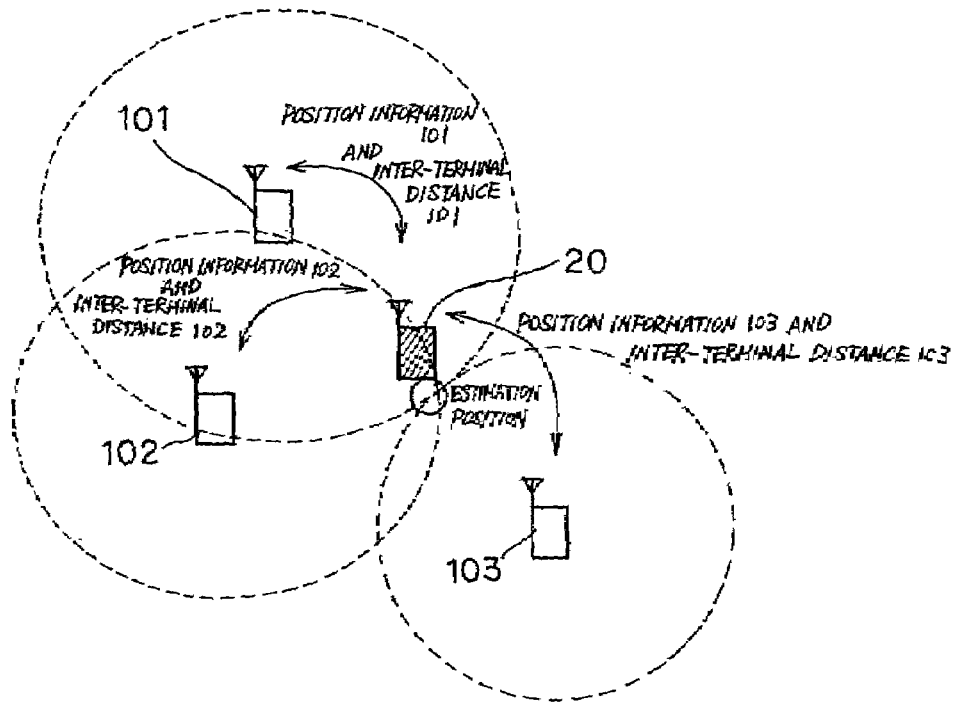
FIG. 6 is a diagram for explaining a positioning method using the mobile terminal illustrated in FIG. 5.

In the following, explanation will be given of a positioning method using the mobile terminal configured as described above with reference to FIG. 6.

Based on the position information on neighboring mobile terminals 101–103 supplied from neighboring mobile terminal communication unit 12 to position information calculation unit 13 and the inter-terminal distance information supplied from neighboring mobile terminal distance measuring unit 14 to position information calculation unit 13, circles having the radii equal to the respective inter-terminal distances can be drawn about the positions of neighboring mobile terminals 101–103.

The existence of mobile terminal 20 can be estimated at a position at which the plurality of circles intersect, as drawn about the plurality of neighboring mobile terminals 101–103.

A larger number of the circles are drawn as there are a larger number of neighboring mobile terminals 101–103, so that a certain estimation accuracy can be maintained for mobile terminal 20 even if the accuracy of the position information is more or less low in neighboring mobile terminals 101–103.

In this embodiment, the positioning can be achieved through the position estimation in a higher accuracy even if neighboring mobile terminals unevenly distribute.

Third Embodiment

Figure 7:
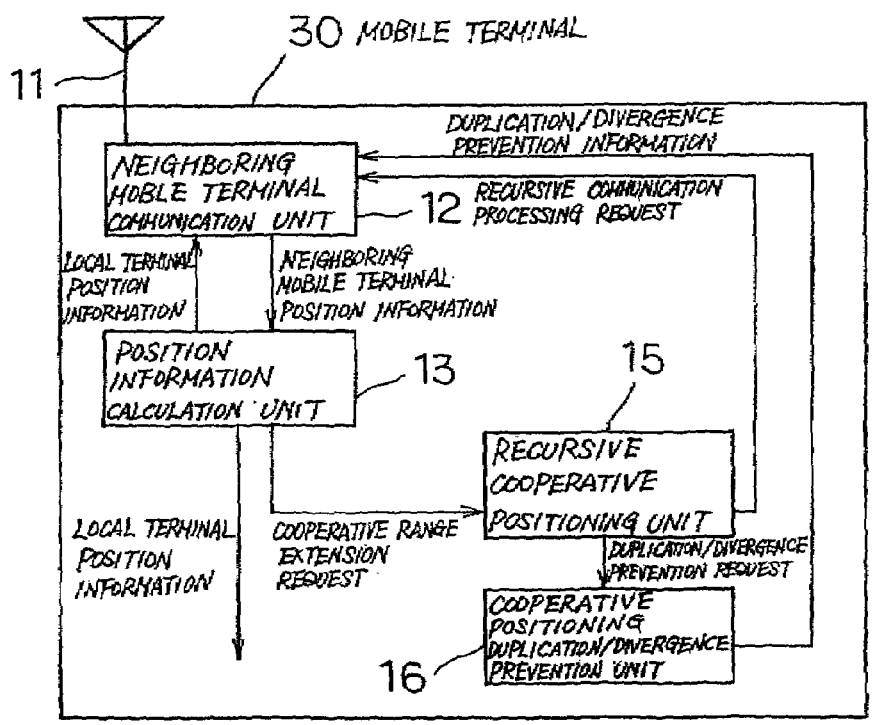
FIG. 7 is a block diagram illustrating a third embodiment of the mobile terminal having a positioning function according to the present invention.

As illustrated in FIG. 7, mobile terminal 30 according to a third embodiment is additionally provided with a recursive cooperative positioning unit 15 and cooperative positioning duplication/divergence prevention unit 16, in addition to the components of mobile terminal 10 illustrated in FIG. 2.

In mobile terminal 30, when a desired quality is not available for position information, position information calculation unit 13 supplies a cooperative range extension request to recursive cooperative positioning unit 15.

Upon receipt of the cooperative range extension request from position information calculation unit 13, recursive cooperative positioning unit 15 supplies a recursive communication processing request to neighboring mobile terminal communication unit 12.

Upon receipt of the recursive communication processing request supplied from recursive cooperative positioning unit 15, neighboring mobile terminal communication unit 12 communicates with neighboring mobile terminals available for communications with mobile terminal 30, with an additional request for performing the positioning in cooperation with mobile terminals existing near neighboring mobile terminals for receiving position information from neighboring mobile terminals existing in a wider range.

Further, a neighboring mobile terminal, which has received the request, repeats a similar operation.

In this way, mobile terminal 30 is more likely to acquire information from neighboring mobile terminals having positioning information by performing cooperative positioning among neighboring mobile terminals through the recursively repeated procedure.

The foregoing positioning method, however, is susceptible to divergence of a range in which the cooperative positioning is performed, or to duplicated cooperative positioning with neighboring mobile terminals which have already participated in the cooperative positioning.

To prevent such disadvantages, recursive cooperative positioning unit 15 supplies cooperative positioning duplication/divergence prevention unit 16 with a duplication/divergence prevention request.

Upon receipt of the duplication/divergence prevention request supplied from recursive cooperation positioning unit 15, cooperative positioning duplication/divergence prevention unit 16 supplies neighboring mobile terminal communication unit 12 with duplication/divergence prevention information for preventing the foregoing divergence of a range in which the cooperative positioning is performed, and for preventing duplicated cooperative positioning. Here, in the duplication/divergence prevention information, duplication information may include log information on mobile terminals which have participated in the recursive cooperative positioning in the past, while divergence prevention information may be a specified upper limit value for the number of times of hoppings.

When neighboring mobile terminal communication unit 12 receives the duplication/divergence prevention information together with position information from another mobile terminal, recursive cooperative positioning unit 15 stops supplying the recursive communication processing request to neighboring mobile terminal communication unit 12 even if it has received the cooperative range extension request from position information calculation unit 13.

Figure 8:
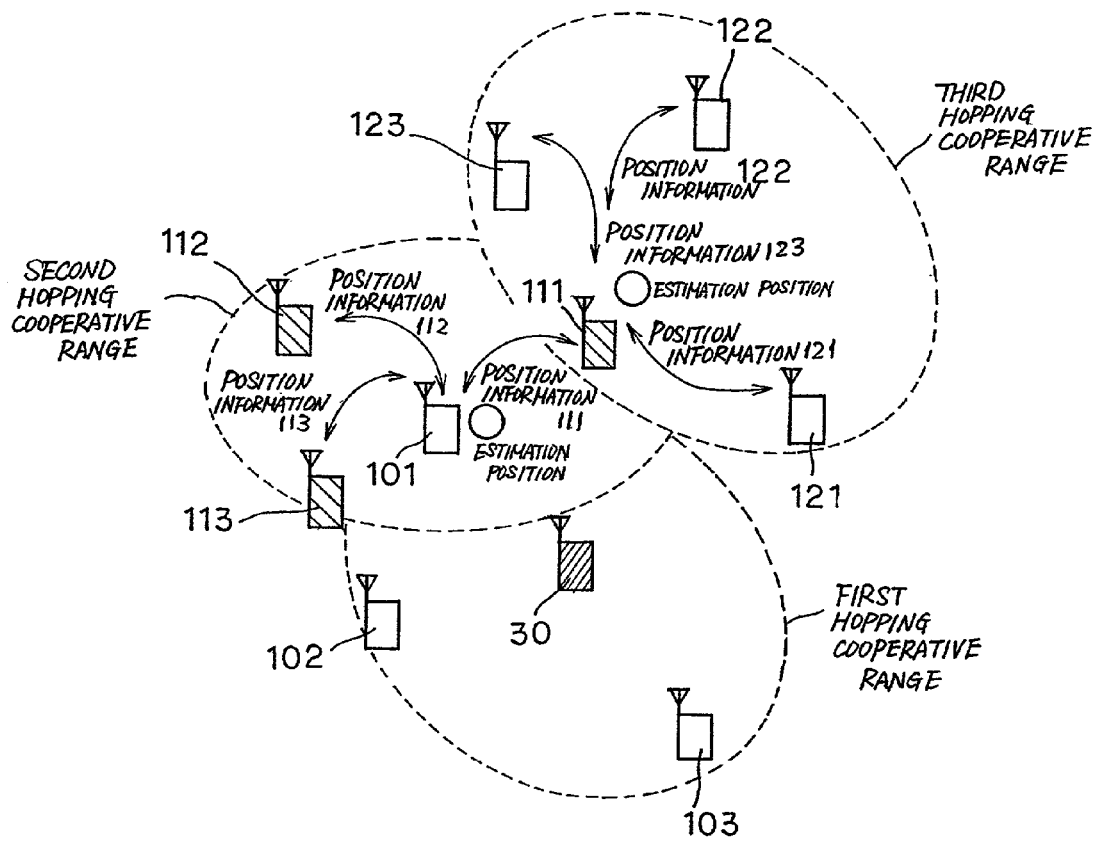
FIG. 8 is a diagram for explaining a positioning method using the mobile terminal illustrated in FIG. 7.

In the following, explanation will be given of a positioning method using the mobile terminal configured as described above with reference to FIG. 8.

Mobile terminal 30 transmits a recursive cooperative positioning request to neighboring mobile terminals 101–103 if mobile terminal 30 has a low accuracy for the position information on mobile terminal 30 or cannot acquire the position information.

Neighboring mobile terminal 101, which has received the recursive cooperative positioning request transmitted from mobile terminal 30, communicates position information with neighboring mobile terminals 111–113 existing nearby to acquire estimated position A for neighboring mobile terminal 101. Neighboring mobile terminals 102, 103 also acquire position information using a similar method.

Next, with a low position information accuracy for estimated position A, neighboring mobile unit 101 further transmits a recursive cooperative positioning request to neighboring mobile terminals 111–113.

Neighboring mobile terminal 111, which has received the recursive cooperative positioning request transmitted from neighboring mobile terminal 101, communicates position information with neighboring mobile terminals 121–123 to acquire estimated position B for neighboring mobile terminal 111. Neighboring mobile terminals 112, 113 also acquire position information using a similar method.

In the foregoing manner, the recursive cooperative positioning is repeatedly performed with a first hopping cooperative range in which the cooperative positioning is performed through communications of information with one hopping from mobile terminal 30 positioned as the origin, a second hopping cooperative range in which the cooperative positioning is performed with two hoppings, and a third hopping cooperative range in which the cooperative positioning is performed with three hoppings, to extend the cooperative range, thereby making it possible to improve the positioning accuracy with the position information acquired from a larger number of mobile terminals having positioning information.

Since the use of the foregoing positioning method may cause the cooperative range to diverge, the cooperative positioning duplication/divergence prevention unit 16 sets an upper limit to the number of times of hoppings, and the position information is communicated among terminals together with the upper limit added thereto. In addition, for preventing a duplicated cooperative positioning range, the position information is communicated between terminals with the additional log information on mobile terminals which have already participated in the cooperative positioning.

In it way, it is possible to prevent the divergence of a range in which the cooperative positioning is performed, and duplicated cooperative positioning performed between neighboring mobile terminals which have already participated in the cooperative positioning.

Fourth Embodiment

Figure 9:
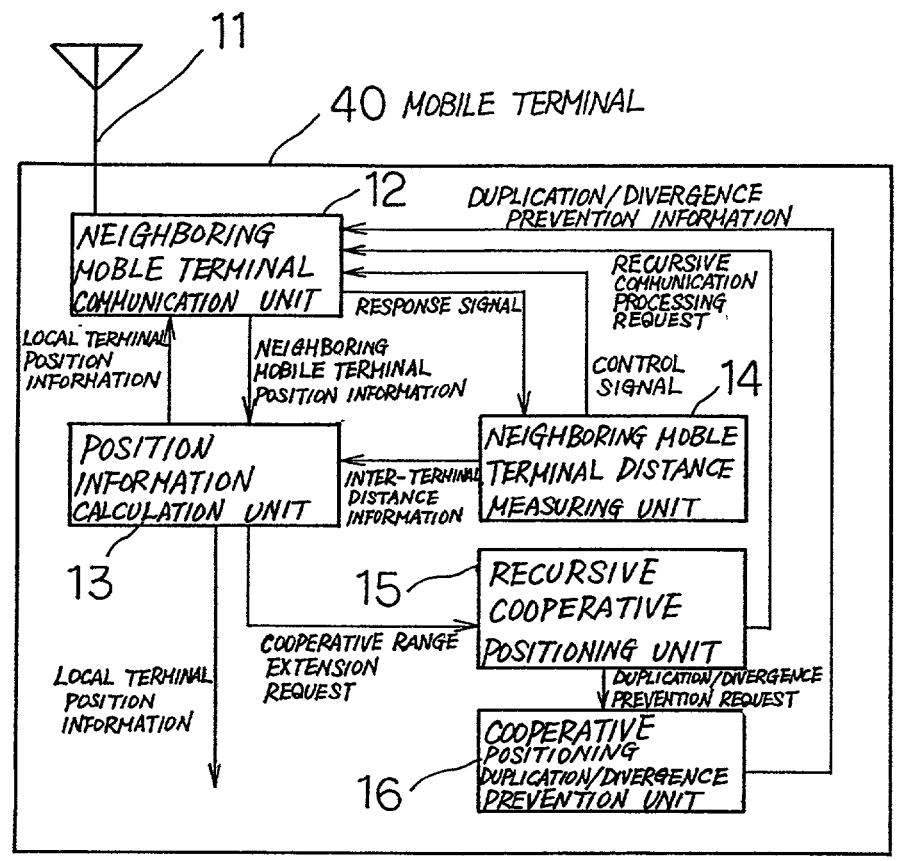
FIG. 9 is a block diagram illustrating a fourth embodiment of the mobile terminal having a positioning function according to the present invention.
Figure 1:
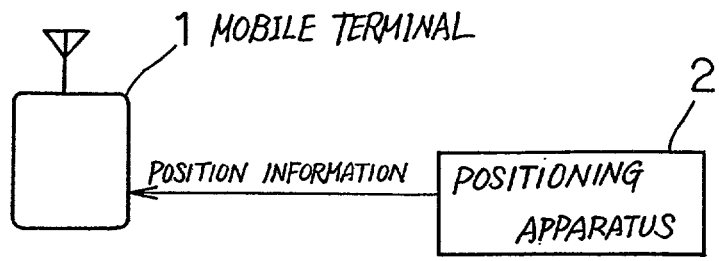
FIG. 1 is a diagram for explaining a conventional positioning method in a mobile terminal.

As illustrated in FIG. 9, mobile terminal 40 according to a fourth embodiment is additionally provided with a recursive cooperative positioning unit 15 and a cooperative positioning duplication/divergence prevention unit 16 in addition to the components of mobile terminal 20 illustrated in FIG. 5.

The mobile terminal having the positioning function configured as described above can provide advantages of improving both the estimation accuracy for position information resulting from the measurement of the distance between mobile terminals as explained in the second embodiment and the estimation accuracy for position information resulting from the extension of the cooperative range between terminals as explained in the third embodiment. It is therefore possible to realize more accurate positioning.

As described above, since the mobile terminal according to the present invention is configured to calculate position information on the mobile terminal using position information on neighboring mobile terminals existing near the mobile terminal, the position of the mobile terminal can be calculated to perform the positioning using the mobile terminal even when the mobile terminal exists at a site at which the mobile terminal, even equipped with a positioning apparatus of an existing positioning system, suffers from an insufficient positioning accuracy or fails to achieve the positioning, such as within a building, on a road in an urban area surrounded by buildings, or the like, or even when the mobile terminal is not equipped with a positioning apparatus of an existing positioning system.

Also, with the neighboring mobile terminal distance measuring unit for calculating the distance between the mobile terminal and a neighboring mobile terminal existing near the mobile terminal, the mobile terminal can acquire more accurate positioning information even when neighboring mobile terminals unevenly distribute.

Further, with the recursive cooperative positioning unit for controlling the mobile terminal to recursively repeat the acquisition of position information from mobile terminals existing near the mobile terminal, the mobile terminal can acquire position information on a larger number of mobile terminals to further improve the positioning accuracy.

Moreover, in this event, with the cooperative positioning duplication/divergence prevention unit for controlling the mobile terminal to limit the number of times recursive position information is acquired and to prevent the mobile terminal from acquiring position information repeatedly from one mobile terminal, it is possible to prevent the divergence of a range in which the cooperative positioning is performed among mobile terminals, and to prevent the acquisition of duplicated position information from a mobile terminal from which the position information has already been acquired.

While preferred embodiments of the present invention have been described using specific terms, such description is for illustrative purposes only, and it is to be understood that changes and variations may be made without departing from the sprit or scope of the following claims.

What is claimed is:

1. A positioning method using a mobile terminal, said positioning method comprising:
   acquiring, by said mobile terminal, position information on a neighboring mobile terminal from said neighboring mobile terminal;
   gradually changing a field strength of a transmitted signal that is transmitted from said mobile terminal;
   receiving, by said mobile terminal, a response signal from said neighboring mobile terminal in response to said transmitted signal;
   estimating a distance between said mobile terminal and said neighboring mobile terminal, said estimation of said distance based on the field strength of the transmitted signal at a time that said response signal is received; and
   calculating a position of said mobile terminal based on the estimated distance and said position information acquired from said neighboring mobile terminal.

2. The positioning method using the mobile terminal according to claim 1, further comprising:
   calculating a position of said neighboring mobile terminal based on position information on a mobile terminal existing near said neighboring mobile terminal; and
   calculating the position of said mobile terminal based on the result of the calculation of the position of said neighboring mobile terminal.

3. The positioning method using the mobile terminal according to claim 2, further comprising:
   recursively repeating the acquisition of the position information in state of setting a limit to a number of times said neighboring mobile terminal acquires the position information from the mobile terminal existing near said neighboring mobile terminal so as not to acquire the position information repeatedly from one mobile terminal.

4. The positioning method of claim 1, wherein said estimating step comprises:
   estimating a distance between said mobile terminal and said neighboring mobile terminal, said estimation of said distance based on the field strength of the transmitted signal at a time that said response signal is received and not based on a signal propagation delay time between the mobile terminal and the neighboring mobile terminal.

5. A positioning method using a mobile terminal, said positioning method comprising:
   acquiring, by said mobile terminal, position information on a neighboring mobile terminal from said neighboring mobile terminal;
   gradually changing a reception sensitivity of said mobile terminal;
   receiving, by said mobile terminal, a signal transmitted from said neighboring mobile terminal;
   estimating a distance between said mobile terminal and said neighboring mobile terminal, said estimation of said distance based on the reception sensitivity of the mobile terminal at a time that said signal is received by said mobile terminal; and
   calculating a position of said mobile terminal based on the estimated distance said position information acquired from said neighboring mobile terminal.

6. The positioning method using the mobile terminal according to claim 5, further comprising:
   calculating a position of said neighboring mobile terminal based on position information on a mobile terminal existing near said neighboring mobile terminal; and
   calculating the position of said mobile terminal based on the result of the calculation of the position of said neighboring mobile terminal.

7. The positioning method using the mobile terminal according to claim 6, further comprising:
   recursively repeating the acquisition of the position information in state of setting a limit to a number of times said neighboring mobile terminal acquires the position information from the mobile terminal existing near said neighboring mobile terminal so as not to acquire the position information repeatedly from one mobile terminal.

8. The positioning method of claim 5, wherein said estimating step comprises:
   estimating a distance between said mobile terminal and said neighboring mobile terminal, said estimation of said distance based on the reception sensitivity of the mobile terminal at a time that said signal is received by said mobile terminal and not based on a signal propagation delay time between the mobile terminal and the neighboring mobile terminal.

9. A positioning method using a mobile terminal comprising the steps of:
   acquiring position information on a neighboring mobile terminal existing near said mobile terminal from said neighboring mobile terminal existing nearby;
   calculating the position of said mobile terminal based on said position information to perform positioning;
   calculating the position of said neighboring mobile terminal based on position information on a mobile terminal existing near said neighboring mobile terminal; and calculating the position of said mobile terminal based on the result of calculation; and recursively repeating the acquisition of the position information in state of setting a limit to the number of times said neighboring mobile terminal acquires the position information from a mobile terminal existing near said neighboring mobile terminal so as not to acquire the position information repeatedly from one mobile terminal.

10. A positioning method using a mobile terminal comprising the steps of:

acquiring position information on a neighboring mobile terminal existing near said mobile terminal from said neighboring mobile terminal existing nearby;

calculating the position of said mobile terminal based on said position information to perform positioning;

measuring the distance between said mobile terminal and said neighboring mobile terminal; and calculating the position of said mobile terminal based on the result of measurement and said position information acquired from said neighboring mobile terminal;

calculating the position of said neighboring mobile terminal based on position information on a mobile terminal existing near said neighboring mobile terminal; and calculating the position of said mobile terminal based on the result of calculation; and recursively repeating the acquisition of the position information in state of setting a limit to the number of times said neighboring mobile terminal acquires the position information from a mobile terminal existing near said neighboring mobile terminal so as not to acquire the position information repeatedly from one mobile terminal.

11. A mobile terminal having a positioning function, said mobile terminal comprising:

an antenna for transmitting and receiving signals;

neighboring mobile terminal communication unit for receiving, through said antenna, position information on a neighboring mobile terminal that is transmitted from said neighboring mobile terminal;

neighboring mobile terminal distance measuring unit for gradually changing a field strength of a transmitted signal that is transmitted from said antenna, and for receiving through said antenna a response signal from said neighboring mobile terminal in response to said transmitted signal, and for estimating a distance between said mobile terminal and said neighboring mobile terminal, said estimation of said distance based on the field strength of the transmitted signal at a time that said response signal is received; and position information calculation unit for calculating a position of said mobile terminal based on the distance estimated by said neighboring mobile terminal distance measuring unit and based on the position information received by said neighboring mobile terminal communication unit.

12. The mobile terminal according to claim 11, further comprising:

recursive cooperative positioning unit for adding a request for recursively repeating acquisition of position information on a mobile terminal existing near the neighboring mobile terminal to a signal transmitted from said neighboring mobile terminal communication unit to said mobile terminal existing near said neighboring mobile terminal.

13. The mobile terminal according to claim 12, further comprising:

cooperative positioning duplication/divergence prevention unit for adding a request for limiting a number of times the position information is recursively acquired to a signal transmitted from said neighboring mobile terminal communication unit to the neighboring mobile terminal, and for preventing the acquisition of the position information repeatedly from one mobile terminal.

14. The mobile terminal of claim 11, wherein said estimation of said distance by said neighboring mobile terminal distance measuring unit is not based on a signal propagation delay time between the mobile terminal and the neighboring mobile terminal.

15. A mobile terminal having a positioning function, said mobile terminal comprising:

an antenna for transmitting and receiving signals;

neighboring mobile terminal communication unit for receiving, through said antenna, position information on a neighboring mobile terminal that is transmitted from said neighboring mobile terminal;

neighboring mobile terminal distance measuring unit for gradually changing a reception sensitivity in said neighboring mobile terminal communcication unit, and for receiving a response signal form said neighboring mobile terminal communication unit when said neighboring mobile terminal communication unit receives signal, through said antenna, from said neighboring mobile terminal, and for estimation a distance between said mobile terminal and said neighboring mobile terminal, said estimation of said distance based on the reception sensitivity of the neighboring mobile terminal communication unit when said signal is received from said neighboring mobile terminal; and position information calculation unit for calculating a position of said mobile terminal based on the distance estimated by said neighboring mobile terminal distance measuring unit and based on the position information received by said neighboring mobile terminal communication unit.

16. The mobile terminal according to claim 15, further comprising:

recursive cooperative positioning unit for adding a request for recursively repeating acquisition of position information on a mobile terminal existing near the neighboring mobile terminal to a signal transmitted from said neighboring mobile terminal communication unit to said mobile terminal existing near said neighboring mobile terminal.

17. The mobile terminal according to claim 16, further comprising:

cooperative positioning duplication/divergence prevention unit for adding a request for limiting a number of times the position information is recursively acquired to a signal transmitted from said neighboring mobile terminal communication unit to the neighboring mobile terminal, and for preventing the acquisition of the position information repeatedly from one mobile terminal.

18. The mobile terminal of claim 15, wherein said estimation of said distance by said neighboring mobile terminal distance measuring unit is not based on a signal propagation delay time between the mobile terminal and the neighboring mobile terminal.

19. A mobile terminal having a positioning function, comprising:
- an antenna for transmitting and receiving a radio signal;
- neighboring mobile terminal communicating means for transmitting position information on said mobile terminal through said antenna, and for receiving position information on a neighboring mobile terminal existing near said mobile terminal, transmitted from said neighboring mobile terminal, through said antenna;
- position information calculating means for calculating the position of said mobile terminal based on the position information received by said neighboring mobile terminal communicating means; and
- recursive cooperative positioning means for adding a request for recursively repeating acquisition of position information on a mobile terminal existing near a neighboring mobile terminal existing near said mobile terminal to a signal transmitted from said neighboring mobile terminal communicating means to said mobile terminal existing near said mobile terminal.

20. The mobile terminal having a positioning function according to claim 19, further comprising:
- neighboring mobile terminal distance measuring means for measuring the distance between said mobile terminal and said neighboring mobile terminal, and
- wherein said position information calculating means calculates the position of said mobile terminal based on the result of measurement in said neighboring mobile terminal distance measuring means, and the position information received by said neighboring terminal communicating means.

21. The mobile terminal having a positioning function according to claim 20, further comprising:
- cooperative positioning duplication/divergence preventing means for adding a request for limiting the number of times the position information is recursively acquired, and for preventing the acquisition of the position information repeatedly from one mobile terminal to a signal transmitted from said neighboring mobile terminal communicating means to a neighboring mobile terminal existing near said mobile terminal.

22. The mobile terminal having a positioning function according to claim 19, further comprising:
- cooperative positioning duplication/divergence preventing means for adding a request for limiting the number of times the position information is recursively acquired, and for preventing the acquisition of the position information repeatedly from one mobile terminal to a signal transmitted from said neighboring mobile terminal communicating means to a neighboring mobile terminal existing near said mobile terminal.

* * * * *